United States Patent
Ban et al.

(10) Patent No.: US 8,192,703 B2
(45) Date of Patent: Jun. 5, 2012

(54) REACTOR AND REACTING METHOD

(75) Inventors: Hiroyuki Ban, Takasago (JP); Koji Noishiki, Takasago (JP); Kazuto Okada, Kobe (JP); Seiichi Yamamoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 223 days.

(21) Appl. No.: 12/482,903

(22) Filed: Jun. 11, 2009

(65) Prior Publication Data

US 2010/0178213 A1 Jul. 15, 2010

Related U.S. Application Data

(60) Provisional application No. 61/144,245, filed on Jan. 13, 2009.

(51) Int. Cl.
*B01J 8/00* (2006.01)
*B01L 3/00* (2006.01)
*B01F 5/06* (2006.01)

(52) U.S. Cl. ........ 422/603; 422/187; 422/224; 422/502; 422/129; 366/336; 366/340

(58) Field of Classification Search .................. 422/187, 422/129, 224, 502, 603; 366/336, 340
See application file for complete search history.

(56) References Cited

U.S. PATENT DOCUMENTS

2006/0275184 A1 12/2006 Furukawa et al.

FOREIGN PATENT DOCUMENTS

| JP | 2004-125477 | 4/2004 |
|---|---|---|
| JP | 2004-141815 | 5/2004 |
| JP | 2004-290971 | 10/2004 |
| JP | 2005-46650 | 2/2005 |
| JP | 2005-88111 | 4/2005 |

(Continued)

OTHER PUBLICATIONS

Office Action issued Sep. 28, 2010, in Japanese Patent Application No. 2007-001120.

(Continued)

*Primary Examiner* — Walter D Griffin
*Assistant Examiner* — Lessanework Seifu
(74) *Attorney, Agent, or Firm* — Oblon, Spivak, McClelland, Maier & Neustadt, L.L.P.

(57) ABSTRACT

To improve reaction efficiency by increasing a contact area of first and second reactants per unit volume, without reducing dimensions of the inlet paths for the first and second reactants in a layer-thickness direction, a channel includes a first inlet path having the first reactant, a parallel second inlet path separated from the first inlet path and having the second reactant, a junction channel for causing the first and second reactants to join as separate laminar flows, and a parallel reaction channel connected with a downstream side of the junction channel for permitting the laminar flows of the first and second reactants to react at a contact interface thereof. A dimension of the reaction channel in the layer-thickness direction perpendicular to the contact interface is set to be smaller than the sum of the dimensions of the first inlet path and the second inlet path in the layer-thickness direction.

2 Claims, 6 Drawing Sheets

FOREIGN PATENT DOCUMENTS

| | | |
|---|---|---|
| JP | 2005-161125 | 6/2005 |
| JP | 2005-169386 | 6/2005 |
| JP | 2006-272107 | 10/2006 |
| JP | 2006-346671 | 12/2006 |
| JP | 2007-533422 | 11/2007 |
| JP | 2008-520412 | 6/2008 |
| WO | WO 2005/049196 A1 | 6/2005 |
| WO | WO2007/072002 * | 6/2007 |

OTHER PUBLICATIONS

Japanese Office Action issued Sep. 13, 2011, in Patent Application No. 2007-001120 (with English-language translation).
U.S. Appl. No. 13/143,092, filed Jul. 1, 2011, Noishiki, et al.
U.S. Appl. No. 13/143,299, filed Jul. 5, 2011, Noishiki, et al.
U.S. Appl. No. 13/296,810, filed Nov. 15, 2011, Noishiki, et al.

* cited by examiner

REACTOR AND REACTING METHOD

BACKGROUND OF THE INVENTION

1. Field of the Invention

The present invention relates to a reactor and a reacting method.

2. Description of the Background Art

It has been a conventional practice to react a first reactant and a second reactant at a contact interface thereof by bringing the both reactants into contact with each other. In order to improve reaction efficiency of the both reactants in this case, a contact area of the both reactants per unit volume is increased by bringing the both reactants into contact in the form of laminar flows. As an example, in a reactor disclosed in Japanese Unexamined Patent Publication No. 2004-290971, a desired reaction product is produced by reacting a first reactant and a second reactant at a contact interface thereof in the form of laminar flows in a thin reaction channel. Specifically, in the reactor of Japanese Unexamined Patent Publication No. 2004-290971, an inlet path for introducing the reactants into the reaction channel is provided and this inlet path is partitioned into two upper and lower sections by a rectifying plate. The first reactant is flowed in one section of the inlet path partitioned by the rectifying plate, the second reactant is flowed in the other, and these two reactants are brought into contact with each other in the form of laminar flows vertically separated in the reaction channel located downstream of the inlet path and react at the contact interface thereof.

In this reactor of Japanese Unexamined Patent Publication No. 2004-290971, the first reactant introduced into the one section of the inlet path and the second reactant introduced into the other section overlap each other in the reaction channel while maintaining the layer thicknesses thereof. There is a limit in reducing the respective layer thicknesses in the sections located above and below the rectifying plate out of spaces of the inlet path partitioned by the rectifying plate in the forming process of these sections and, resulting from this, there is a limit in reducing the layer thicknesses of the first and second reactants. Thus, in the construction of Japanese Unexamined Patent Publication No. 2004-290971, there is also a limit in increasing the contact area of the two reactants per unit volume in the reaction channel, with the result that there is a limit in improving the reaction efficiency of the two reactants.

SUMMARY OF THE INVENTION

An object of the present invention is to improve reaction efficiency by increasing a contact area of a first reactant and a second reactant per unit volume without reducing dimensions of inlet paths for the first and second reactants in a layer-thickness direction.

One aspect of the present invention is directed to a reactor for reacting first and second reactants while flowing them, comprising a channel forming body internally formed with a channel extending in a specific direction for flowing the first and second reactants in the specific direction, wherein the channel includes a first inlet path arranged at an entrance side of the channel and having the first reactant introduced thereinto; a second inlet path arranged while being separated from the first inlet path with a partition wall of the channel forming body located therebetween and having the second reactant introduced thereinto; a junction channel connected with a downstream side of the first inlet path and that of the second inlet path for causing the first reactant flowing via the first inlet path and the second reactant flowing via the second inlet path to join in the form of laminar flows separated from each other; and a reaction channel connected with a downstream side of the junction channel for permitting the laminar flow of the first reactant and that of the second reactant held in contact with each other and reacting the two reactants at a contact interface thereof, and a dimension of the reaction channel in the layer-thickness direction perpendicular to the contact interface is set to be smaller than the sum of a dimension of the first inlet path in the layer-thickness direction and a dimension of the second inlet path in the layer-thickness direction.

DETAILED DESCRIPTION OF THE PREFERRED EMBODIMENTS OF THE INVENTION

Hereinafter, embodiments of the present invention are described with reference to the drawings.

First of all, with reference to FIGS. 1 to 4, the construction of a reactor according to one embodiment of the present invention is described.

The reactor according to this embodiment is such that two kinds of reactants, i.e. a first reactant and a second reactant, are reacted with each other to produce a desired reaction product while being flowed in a reaction channel 16 to be described later. This reactor is provided with a channel forming body 2 shown in FIG. 1.

Figure 1:
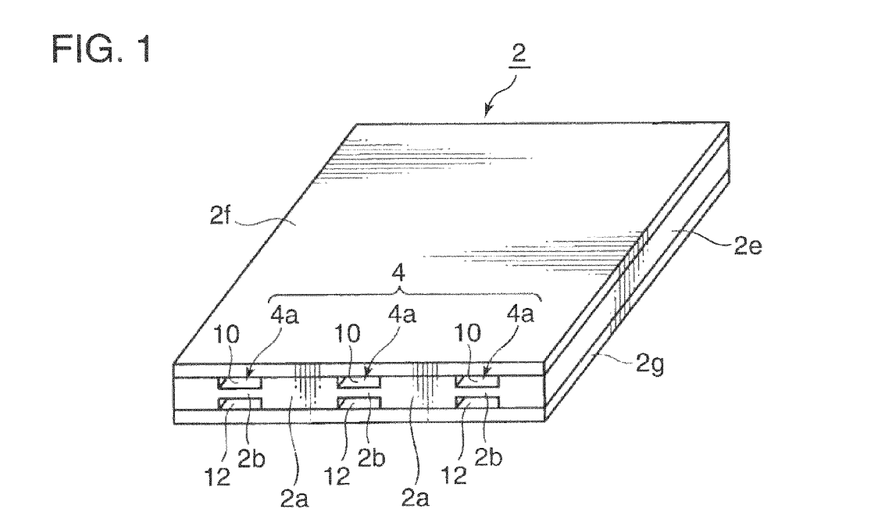
FIG. 1 is a perspective view showing a channel forming body constituting a reactor according to one embodiment of the invention.

The channel forming body 2 has a flat rectangular parallelepipedic outer shape and is installed such that a longitudinal direction thereof is horizontal. This channel forming body 2 is internally formed with a channel 4 for flowing the first and second reactants. The channel 4 is divided into three channels 4a in a width direction thereof by dividing walls 2a of the channel forming body 2. In other words, the three channels 4a having the same configuration are arranged at equal intervals in the width direction of the channel forming body 2. The respective channels 4a extend in the longitudinal direction of the channel forming body 2. With the channel forming body 2 installed, the respective channels 4a are arranged to extend in a horizontal direction. Each channel 4a is formed by a first inlet path 10, a second inlet path 12, a junction channel 14 and a reaction channel 16.

Figure 2:
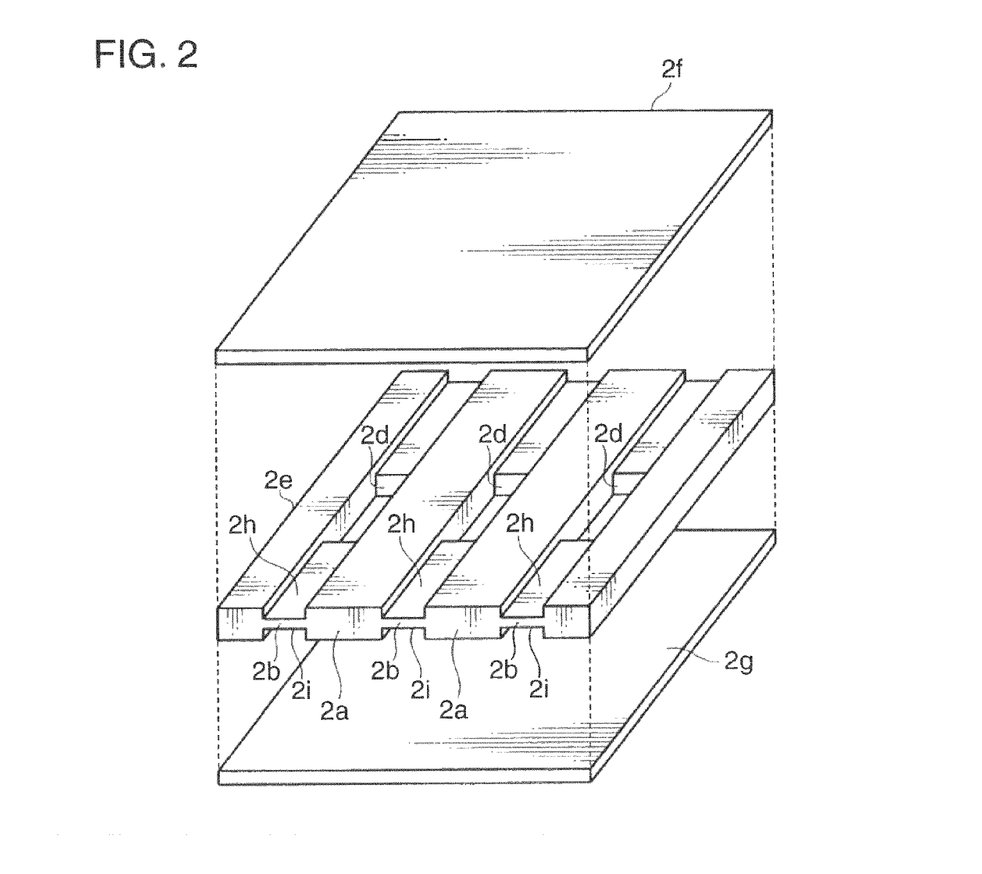
FIG. 2 is an exploded perspective view showing the channel forming body shown in FIG. 1.
Figure 3:
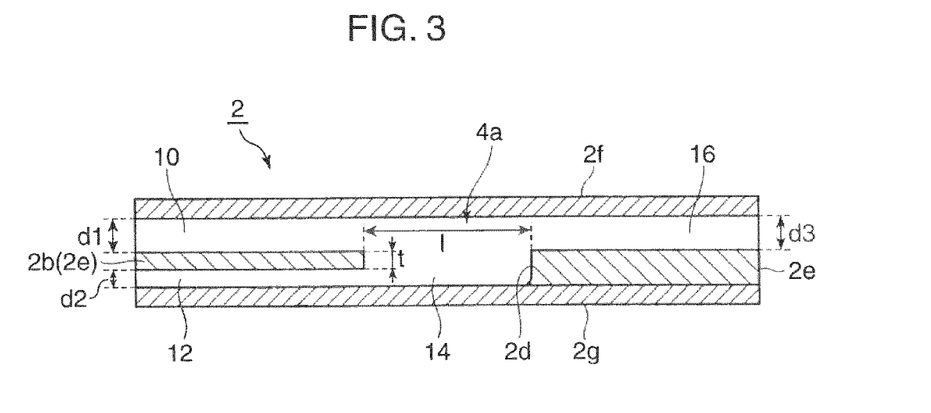
FIG. 3 is a vertical section along a channel of the channel forming body shown in FIG. 1.

The first inlet path 10 and the second inlet path 12 are both arranged at the entrance side of the channel 4a. These first and second inlet paths 10, 12 have rectangular cross sections in a direction perpendicular to the longitudinal direction and have equal width and length. The first and second inlet paths 10, 12 are arranged above and below a partition wall 2b of the channel forming body 2 while being spaced apart, and extend in parallel with each other in the horizontal direction. The first inlet path 10 is a part into which the first reactant is introduced, whereas the second inlet path 12 is a part into which the second reactant is introduced.

Figure 4:
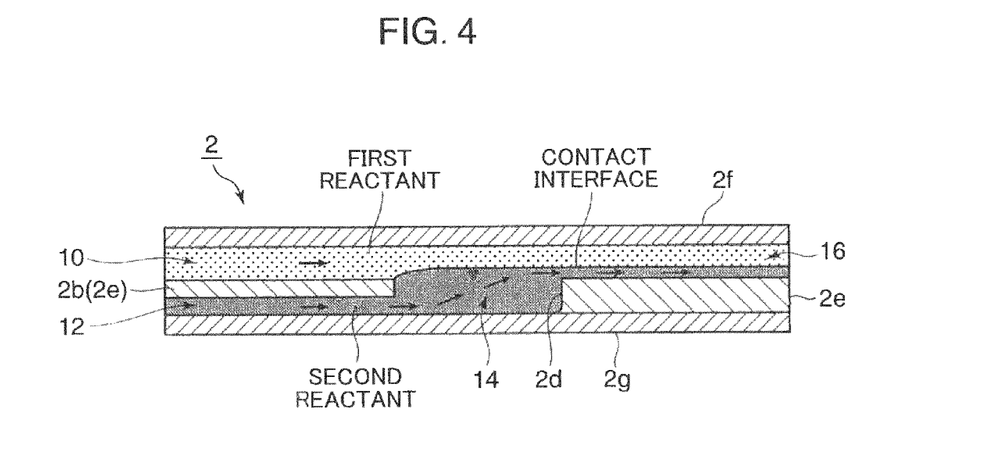
FIG. 4 is a section, corresponding to FIG. 3, showing a flowing state of a first reactant and a second reactant in the channel.

The junction channel 14 is connected with a downstream side of the inlet path 10 and a downstream side of the second inlet path 12. This junction channel 14 is a part where the first reactant flowing via the first inlet path 10 and the second reactant flowing via the second inlet path 12 join in the form of laminar flows separated from each other as shown in FIG. 4. A length l (see FIG. 3) of the junction channel 14 in the flowing direction of the first and second reactants is ten times or more than a dimension t (see FIG. 3) of the partition wall 2b in a layer-thickness direction. This junction channel 14 has the same width as the first and second inlet paths 10, 12 and has a rectangular cross section in the direction perpendicular to the longitudinal direction.

The junction channel 14 is formed such that the laminar flow of the second reactant flowing from the second inlet path 12 joins the laminar flow of the first reactant flowing straight from the first inlet path 10 in the layer-thickness direction perpendicular to a contact interface of the first and second reactants. Specifically, a sealing wall 2d of the channel forming body 2 is provided up to the same height position as the upper surface of the partition wall 2b at a downstream side of the junction channel 14 located on an extension of the second inlet path 12, and the junction channel 14 is formed in an area between this sealing wall 2d and a downstream end portion of the partition wall 2b. The flow of the second reactant flowing from the second inlet path 12 into the junction channel 14 strikes against the sealing wall 2d to move upward through a space between the downstream end portion of the partition wall 2b and the sealing wall 2d and joins the laminar flow of the first reactant flowing from the inlet path 10 into the junction channel 14.

The reaction channel 16 is connected with the downstream side of the junction channel 14, and the first and second reactants joined in the junction channel 14 flow into the reaction channel 16. This reaction channel 16 is for flowing the laminar flows of the first and second reactants with these two reactants held in contact with each other and reacting the two reactants at the contact interface thereof. In this embodiment, as shown in FIG. 3, a dimension d3 of the reaction channel 16 in the layer-thickness direction perpendicular to the contact interface is set to be smaller than the sum of a dimension d1 of the first inlet path 10 in the layer-thickness direction and a dimension d2 of the second inlet path 12 in the layer-thickness direction.

Specifically, the reaction channel 16 and the first inlet path 10 are formed by a single channel extending straight and having a uniform dimension in the layer-thickness direction. In other words, the dimension d3 of the reaction channel 16 in the layer-thickness direction and the dimension d1 of the first inlet path 10 in the layer-thickness direction are equal to each other. The second reactant flowing from the second inlet path 12 and the first reactant flowing straight from the first inlet path 10 join and flow into the reaction channel 16 having the same dimension in the layer-thickness direction as the first inlet path 10. Further, the reaction channel 16 has a rectangular cross section perpendicular to the longitudinal direction and having the same width as the inlet path 10 and the junction channel 14.

Next, a specific structure of the above channel forming body 2 is described.

As shown in FIG. 2, the channel forming body 2 is made up of an intermediate board 2e, an upper board 2f and a lower board 2g sandwiching the intermediate board 2e from upper and lower sides in the layer-thickness direction. These intermediate board 2e, upper board 2f and lower board 2g are all stainless steel boards. The upper surface of the intermediate board 2e and the lower surface of the upper board 2f are diffusion-bonded and the lower surface of the intermediate board 2e and the upper surface of the lower board 2g are diffusion-bonded, whereby the respective boards are united to form the channel forming body 2.

The upper and lower boards 2f, 2g are both flat boards having flat upper and lower surfaces. Upper grooves 2h are formed over the entire length in the upper surface of the intermediate board 2e. Three upper grooves 2h are formed at equal intervals in a width direction of the intermediate board 2e. These upper grooves 2h are for forming the first inlet paths 10, upper parts of the junction channels 14 and the reaction channels 16 and have a depth equal to the dimension d1 of the first inlet paths 10 in the layer-thickness direction and the dimension d3 of the reaction channels 16 in the layer-thickness direction. Openings of these upper grooves 2h are covered by the upper board 2f, thereby forming the first inlet paths 10 and the reaction channels 16.

The lower surface of the intermediate board 2e is formed with lower grooves 2i extending in a longitudinal direction of the intermediate board 2e. These lower grooves 2i are formed at positions corresponding to the respective upper grooves 2*h*. The lower grooves 2*i* form the second inlet paths 12 and lower parts of the junction channels 14 and are formed in a range of a sum length of the second inlet paths 12 and the junction channels 14. The lower grooves 2*i* have a depth equal to the dimension d2 of the second inlet paths 12 in the layer-thickness direction. Openings of these lower grooves 2*i* are covered by the lower board 2*g*, thereby forming the second inlet paths 12.

The partition walls 2*b* are formed by parts of the intermediate board 2*e* located between the upper and lower grooves 2*h*, 2*i*. Openings penetrating in the layer-thickness direction are formed in parts of the partition walls 2*b* corresponding to formation areas of the junction channels 14, and the junction channels 14 are formed by covering the opening parts from the upper and lower sides by the upper and lower boards 2*f*, 2*g*. The sealing walls 2*d* are formed by parts of the intermediate board 2*e* located at the openings forming the junction channels 14 at sides toward the reaction channels 16 and having wall surfaces extending in the layer-thickness direction. Further, parts of the intermediate board 2*e* left between adjacent ones of three pairs of upper and lower grooves 2*h*, 2*i* form the above dividing walls 2*a*.

A processing method of the intermediate board 2*e* is such that the upper grooves 2*h* are first formed over the entire length in the upper surface of a flat stainless steel board by etching. The lower grooves 2*i* are respectively formed in the longitudinal direction of the lower surface of the stainless steel board at positions corresponding to the respective upper grooves 2*h* by etching. At this time, the lower grooves 2*i* are formed in the range of the sum length of the second inlet paths 12 and the junction channels 14. Thereafter, parts of the partition walls 2*b* located between the upper and lower grooves 2*h*, 2*i* and corresponding to the formation area of the junction channels 14 are removed by etching to form the openings penetrating in the layer-thickness direction. In this way, the junction channels 14 are formed, thereby forming the intermediate board 2*e*.

Next, with reference to FIGS. 3 and 4, a reacting method using the reactor according to this embodiment is described.

First of all, the first reactant is introduced into the first inlet paths 10 and the second reactant is introduced into the second inlet paths 12. In this way, the first reactant is flowed into the junction channels 14 via the first inlet paths 10 and the second reactant is flowed into the junction channels 14 via the second inlet paths 12.

At this time, in the junction channels 14, the first reactant and the second reactant join in the form of laminar flows separated from each other in the layer-thickness direction. Here, since paths from the first inlet paths 10 to the reaction channels 16 via the junction channels 14 extend straight, the laminar flows of the first reactant flow straight. On the other hand, paths from the second inlet paths 12 to the reaction channels 16 via the junction channels 14 are bent upward in the junction channels 14, i.e. toward the flowing paths of the first reactant. Thus, the second reactant moves upward (toward the first reactant) in the layer-thickness direction while striking against the sealing walls 2*d* in the junction channels 14 and joins the laminar flows of the first reactant.

At this time, in this embodiment, the movement of the laminar flows of the second reactant in the layer-thickness direction is set to be considerably smaller than the movement of these flows toward the downstream side since the length l (see FIG. 3) of the junction channels 14 in the flowing direction of the first and second reactants is set to be ten times or more than the dimension t (see FIG. 3) of the partition walls 2*b* partitioning between the first and second inlet paths 10, 12 in the layer-thickness direction. In this way, the laminar flows of the second reactant smoothly join those of the first reactant.

The joined laminar flows of the first and second reactants are introduced into the reaction channels 16 in this state. The both reactants react at the contact interfaces thereof while flowing in the reaction channels 16, thereby producing a desired reaction product. In the above manner, the reaction of the first and second reactants according to this embodiment is carried out.

As described above, since the dimension d3 of the reaction channels 16 in the layer-thickness direction is set to be smaller than the sum of the dimension d1 of the first inlet paths 10 in the layer-thickness direction and the dimension d2 of the second inlet paths 12 in the layer-thickness direction in this embodiment, the first and second reactants can be brought into contact with each other in the reaction channels 16 while being formed into laminar flows thinner than in the first and second inlet paths 10, 12. Thus, the layer thickness of the both reactants in the reaction channels 16 can be reduced without reducing the dimensions of the first and second inlet paths 10, 12 in the layer-thickness direction, whereby a contact area of the both reactants per unit volume in the reaction channels 16 can be increased. Therefore, in this embodiment, reaction efficiency can be improved by increasing the contact area of the both reactants per unit volume without reducing the dimensions of the first and second inlet paths 10, 12 in the layer-thickness direction.

Further, in this embodiment, the first inlet paths 10 and the reaction channels 16 are formed by single channels extending straight and having a uniform dimension in the layer-thickness direction, and the junction channels 14 are formed such that the laminar flows of the second reactant from the second inlet paths 12 join the laminar flows of the first reactant flowing straight from the first inlet paths 10 in the layer-thickness direction and are introduced to the reaction channels 16. In this way, the second reactant flowing from the second inlet paths 12 can join the first reactant flowing from the first inlet paths 10 and flow in the reaction channels 16 having the same dimension in the layer-thickness direction as the first inlet paths 10, wherefore the contact area of the two reactants per unit volume in the reaction channels 16 can be reliably increased without reducing the dimensions of the first and second inlet paths in the layer-thickness direction. Further, by the above construction, it can be suppressed that the flows of the first reactant are bent in the layer-thickness direction in the process of reaching the reaction channels 16 from the first inlet paths 10, wherefore resistance acting on the flows of the first reactant can be reduced to smoothly flow the first reactant. Since the channels from the first inlet paths 10 to the reaction channels 16 can be formed straight in the channel forming body 2, this forming process can be more simplified as compared with the case where these channels are bent.

Further, in this embodiment, the first inlet paths 10 are formed by covering the openings of the upper grooves 2*h* of the intermediate board 2*e* forming the channel forming body 2 by the upper board 2*f*, the second inlet paths 12 are formed by covering the openings of the lower grooves 2*i* of the intermediate board 2*e* by the lower board 2*g*, and the parts of the intermediate board 2*e* located between the upper grooves 2*h* and the lower grooves 2*i* form the partition walls 2*b*.

As a method for forming two mutually spaced-part inlet paths in a channel forming body, it is thought to form a single channel in the channel forming body and then to form the two inlet paths by partitioning the channel by a separate partitioning plate at a middle position in a layer-thickness direction. However, in this method, it is very cumbersome to mount the partitioning plate in such a manner as to partition the channel if a dimension of the channel forming body in a thickness direction is small and a dimension of the channel in the layer-thickness direction is very small. In contrast, according to the above construction, the upper grooves 2h at the upper sides of the partition walls 2b can be formed into the first inlet paths 10 and the lower grooves 2i at the lower sides of the partition walls 2b can be formed into the second inlet paths 12 by sandwiching the intermediate board 2e from the opposite upper and lower sides by the upper and lower boards 2f, 2g after the partition walls 2b are first formed in the intermediate board 2e. Thus, the first and second inlet paths 10, 12 can be easily formed even if the dimension of the channel forming body 2 in the thickness direction is small and the dimension of the channels 4a in the layer-thickness direction are very small. Therefore, in this embodiment, the first and second inlet paths 10, 12 can be easily formed even if the dimension of the channel forming body 2 in the thickness direction is small.

Further, since the length l of the junction channels 14 along the flowing direction of the first and second reactants is set to be ten times or more than the dimension t of the partition walls 2b in the layer-thickness direction in this embodiment, the flows of the second reactant in the layer-thickness direction can be made smaller so that the two reactants can smoothly join along the flowing direction when the first reactant flowing from the first inlet paths 10 and the second reactant flowing from the second inlet paths 12 join in the junction channels 14. In this way, the first and second reactants can easily join in the form of laminar flows separated from each other.

Furthermore, since the channel forming body 2 includes the dividing walls 2a dividing the channel 4 in the width direction in this embodiment, a difference between the width and the dimension d3 in the layer-thickness direction of the reaction channels 16 can be made smaller in the respective divided channels 4a while a specified flow rate of the reactants is ensured for the entire channel 4. In this way, a reduction in reaction efficiency between the two reactants in the reaction channels 16 can be suppressed even if the channel forming body 2 is installed while being inclined with respect to the width direction of the channel 4 while specified reaction efficiency is ensured for the entire channel 4.

Figure 8:
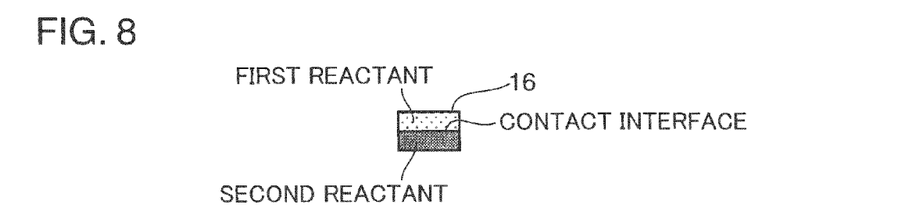
FIG. 8 is a section of the reaction channel in the direction perpendicular to the flowing direction of the both reactants showing a state of the contact interface of the first and second reactants when the reaction channel is horizontal in the case where the channel is divided in the width direction as in the embodiment of the invention.
Figure 9:
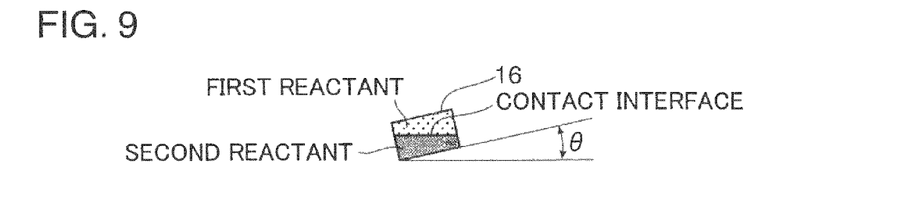
FIG. 9 is a section showing a state where an angle of inclination in the width direction of the reaction channel of FIG. 8 is increased.
Figure 10:
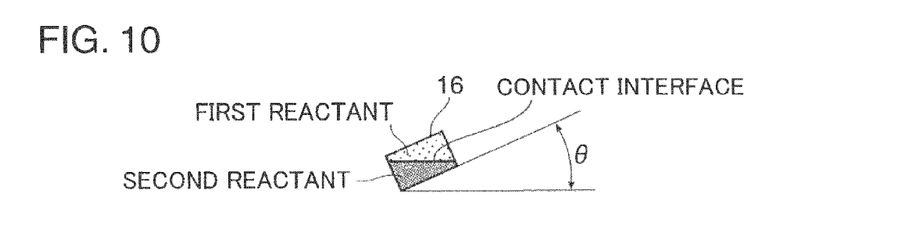
FIG. 10 is a section showing a state where the angle of inclination in the width direction of the reaction channel of FIG. 9 is further increased.

Specifically, if the channel forming body 2 is installed while being inclined with respect to the width direction of the channel 4, the reaction channels 16 are similarly inclined with respect to the width direction. FIGS. 5 to 10 show cross sections of the reaction channel 16 in a direction perpendicular to the flowing direction of the reactants. Out of FIGS. 5 to 10, FIGS. 5 to 7 show how the contact interface of the first and second reactants in the reaction channel 16 changes as an angle of inclination θ with respect to the width direction of the reaction channel 16 increases in the case where the channel 4 is not divided. On the other hand, FIGS. 8 to 10 show a change of the contact interface corresponding to FIGS. 5 to 7 in the case where the channel 4 is divided in the width direction as in this embodiment.

Figure 5:
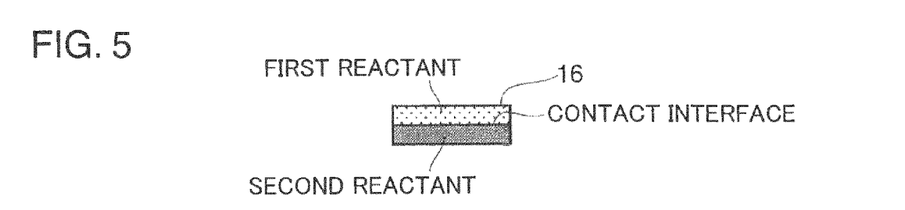
FIG. 5 is a section of a reaction channel in a direction perpendicular to a flowing direction of the both reactants showing a state of a contact interface of the first and second reactants when the reaction channel is horizontal in the case where the channel is not divided in a width direction.
Figure 6:
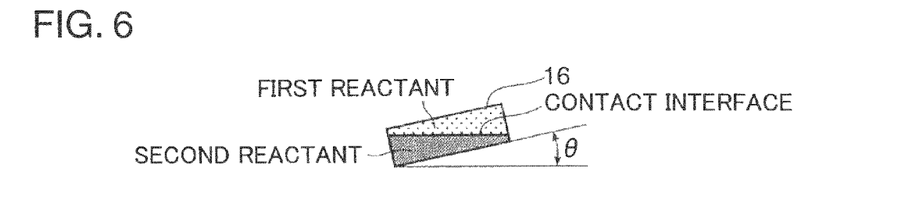
FIG. 6 is a section showing a state where an angle of inclination in the width direction of the reaction channel of FIG. 5 is increased.
Figure 7:
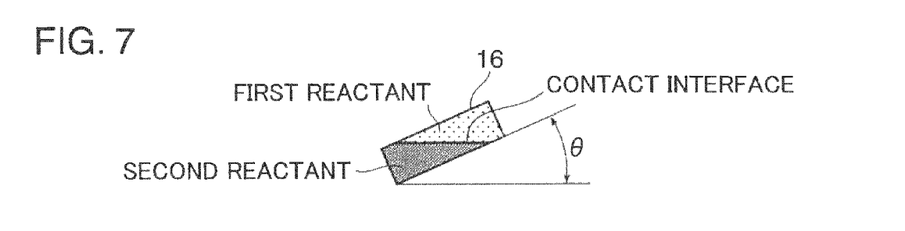
FIG. 7 is a section showing a state where the angle of inclination in the width direction of the reaction channel of FIG. 6 is further increased.

In the case where the channel 4 is not divided in the width direction, the width of the reaction channel 16 is considerably larger than the dimension thereof in the layer-thickness direction as shown in FIG. 5. In this case, as the angle of inclination θ of the reaction channel 16 gradually changes from a state of FIG. 5 to a state of FIG. 7 via a state of FIG. 6, the contact interface is formed to connect the opposite side surfaces of the reaction channel 16 facing in the layer-thickness direction in the reaction channel 16 in the state of FIG. 7. In this case, an area of the contact surface is much smaller as compared with the state of FIG. 6 where the contact interface is formed to connect the opposite side surfaces of the reaction channel 16 facing in the width direction.

In contrast, if the channel 4 is divided by the dividing walls 2a as in this embodiment, a difference between the width and the dimension in the layer-thickness direction of the reaction channel 16 in each divided channel 4a is smaller as compared with the case where the channel 4 is not divided. In this case, even if the angle of inclination θ of the reaction channel 16 is increased as in FIGS. 8 to 10, the contact interface of the two reactants keeps connecting the opposite side surfaces of the reaction channel 16 facing in the width direction and the area of the contact interface is unlikely to decrease. Further, even if the reaction channel 16 is inclined at an angle larger than the angle of inclination θ of FIG. 10 and the contact interface is formed to connect the opposite side surfaces of the reaction channel 16 facing in the layer-thickness direction, a rate of reduction of the area of the contact interface from the state of FIG. 10 can be suppressed to a small rate because the difference between the width and the dimension in the layer-thickness direction of the reaction channel 16 is small. Thus, in the construction of this embodiment, a reduction in reaction efficiency between the two reactants in the reaction channels 16 can be suppressed even if the channel forming body 2 is installed while being inclined with respect to the width direction of the channel 4.

It should be appreciated that the embodiment disclosed this time is illustrative and not restrictive in all points. The scope of the present invention is indicated not by the above description of the embodiment, but by appended claims and embraces all changes within the meaning and scope equivalent to the appended claims.

For example, although the length l of the junction channels 14 along the flowing direction of the first and second reactants is set to be ten times or more than the dimension t of the partition walls 2b in the layer-thickness direction in the above embodiment, the present invention is not limited to such a construction. In other words, the length l of the junction channels 14 along the flowing direction of the first and second reactants may be any length provided that it is larger than the dimension t of the partition walls 2b in the layer-thickness direction.

Figure 11:
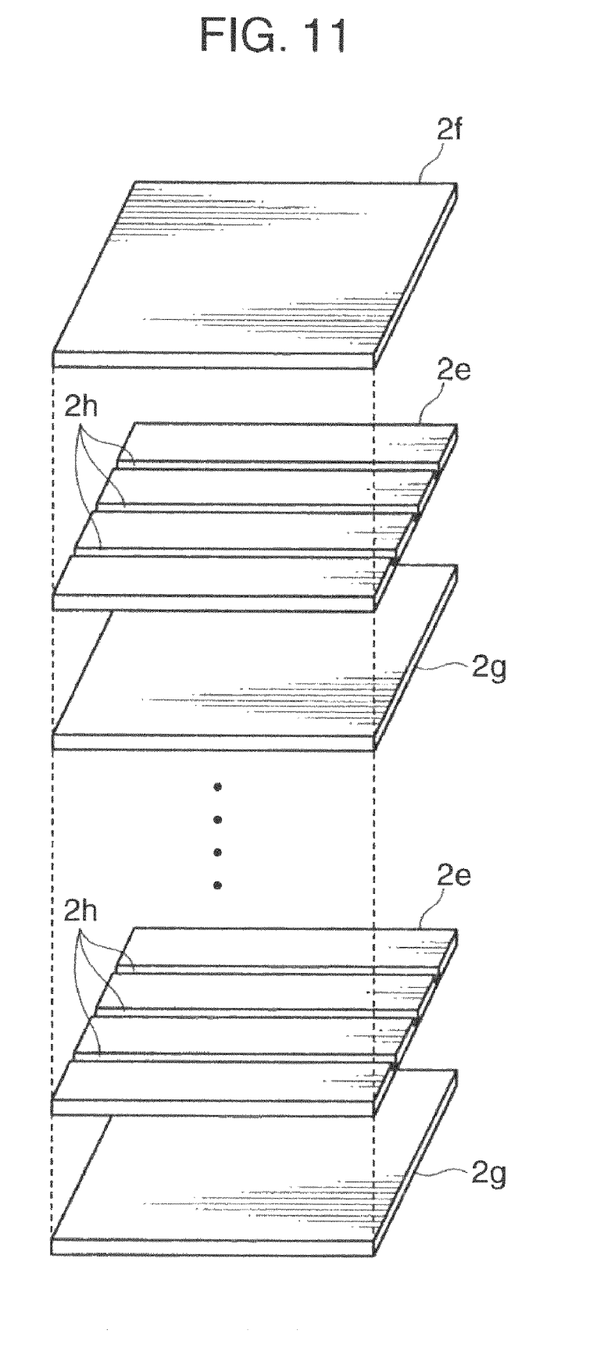
FIG. 11 is an exploded perspective view showing a channel forming body of a reactor according to a first modification of the embodiment of the invention.

Although the reactor includes only the single channel forming body 2 in the above embodiment, the present invention is not limited thereto and a plurality of channel forming bodies may be placed one over another as in a first modification of the above embodiment shown in FIG. 11. By such a construction, production efficiency of a reaction product in the entire reactor can be more improved since larger quantities of first and second reactants can be reacted while flowing.

Figure 12:
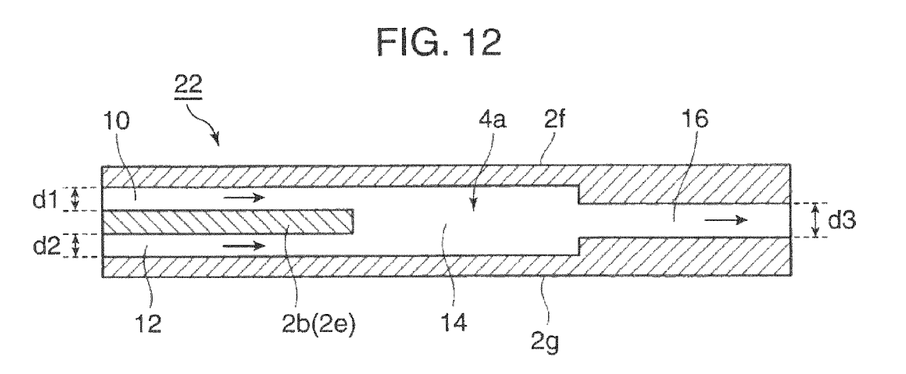
FIG. 12 is an exploded perspective view showing a channel forming body of a reactor according to a second modification of the embodiment of the invention.

Without being limited to the construction of the above embodiment, the reaction channels 16 may be displaced from the extensions of the first inlet paths 10 in the layer-thickness direction as in a channel forming body 22 according to a second modification of the above embodiment shown in FIG. 12. In other words, the reaction channels 16 may be formed in intermediate areas between the first and second inlet paths 10, 12 in the layer-thickness direction. Also in this case, the dimension d3 of the reaction channels 16 in the layer-thickness direction is set to be smaller than the sum of the dimension d1 of the first inlet paths 10 in the layer-thickness direction and the dimension d2 of the second inlet paths 12 in the layer-thickness direction.

By such a construction, the area of the contact interface of the first and second reactants per unit volume in the reaction channels 16 can be increased. Thus, similar to the above embodiment, there can be obtained an effect of being able to more improve the reaction efficiency by increasing the area of the contact interface of the two reactants per unit volume without reducing the dimensions of the first and second inlet paths 10, 12 in the layer-thickness direction.

Figure 13:
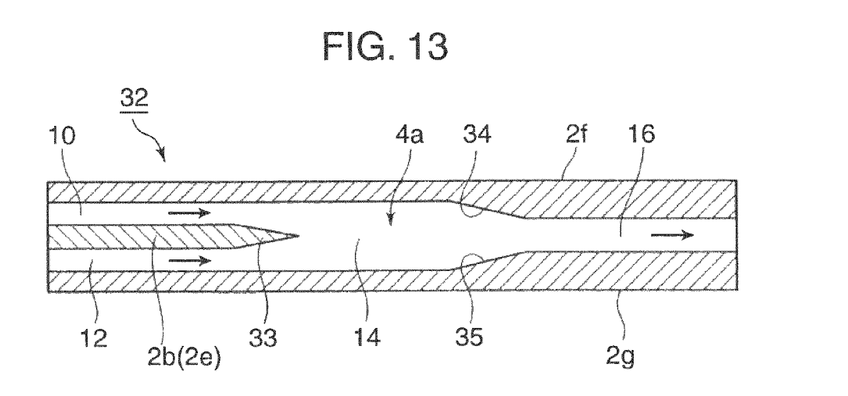
FIG. 13 is an exploded perspective view showing a channel forming body of a reactor according to a third modification of the embodiment of the invention.

Further, in the case of arranging the reaction channels 16 at intermediate positions of the channel forming body 32 in the thickness direction as in a channel forming body 32 according to a third modification shown in FIG. 13, the upper and lower surfaces of end portions 33 of the partition walls 2b toward the junction channels 14 may be slanted such that the thicknesses of the partition walls 2b become gradually smaller toward the downstream side. Further, in this construction, areas 34 of the upper board 2f corresponding to downstream end portions of the junction channels 14 and areas 35 of the lower board 2g corresponding to the downstream end portions of the junction channels 14 may be slanted in such directions as to gradually come closer to each other in the layer-thickness direction toward the downstream side.

By such a construction, the laminar flows of the first reactant flowing via the first inlet paths 10 and those of the second reactant flowing via the second inlet paths 12 can smoothly join in the junction channels 14 and the joined laminar flows can be smoothly introduced into the reaction channels 16.

Figure 14:
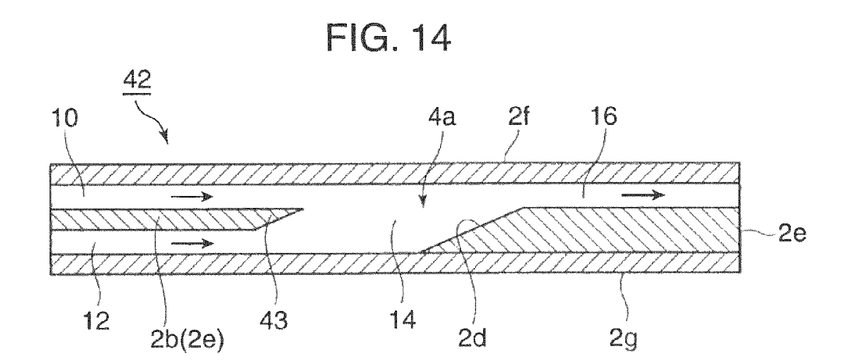
FIG. 14 is an exploded perspective view showing a channel forming body of a reactor according to a fourth modification of the embodiment of the invention.

Further, as in a channel forming body 42 according to a fourth modification shown in FIG. 14, end portions 43 of the lower surfaces of the partition walls 2b toward the junction channels 14 may be so slanted as to gradually come closer to the upper surfaces toward the downstream side in the same construction as in the above embodiment. Furthermore, in this construction, the wall surfaces of the sealing walls 2d toward the junction channels 14 may be so slanted as to gradually come closer to the upper surface of the channel forming body 42 toward the downstream side. In this case, the laminar flows of the second reactant flowing via the second inlet paths 12 can be smoothly introduced into the reaction channels 16 while smoothly joining the laminar flows of the first reactant in the junction channels 14.

Figure 15:
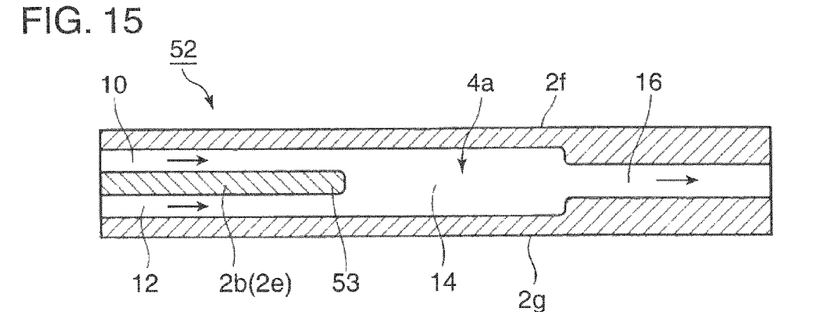
FIG. 15 is an exploded perspective view showing a channel forming body of a reactor according to a fifth modification of the embodiment of the invention.

Further, as in a channel forming body 52 according to a fifth embodiment shown in FIG. 15, the opposite upper and lower corners of end portions 53 of the partition walls 2b toward the junction channels 14 may be rounded and corners of areas of the upper and lower boards 2f, 2g corresponding to the downstream ends of the junction channels 14 may be respectively rounded in the same construction as in the second modification shown in FIG. 12.

Figure 16:
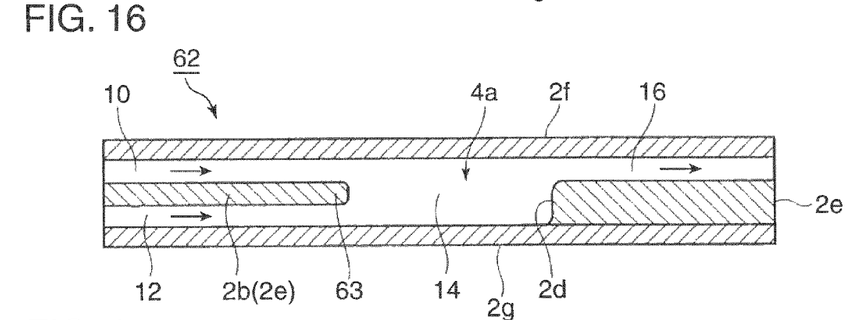
FIG. 16 is an exploded perspective view showing a channel forming body of a reactor according to a sixth modification of the embodiment of the invention.

Further, as in a channel forming body 62 according to a sixth modification shown in FIG. 16, the opposite upper and lower corners of end portions 63 of the partition walls 2b toward the junction channels 14 may be rounded and upper corners of the sealing walls 2d may be rounded in the same construction as in the above embodiment.

Figure 17:
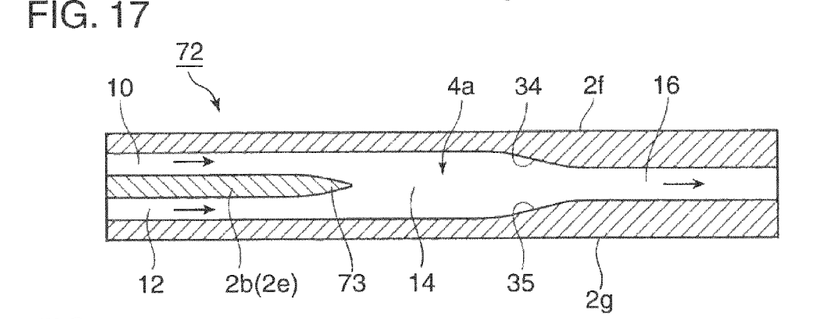
FIG. 17 is an exploded perspective view showing a channel forming body of a reactor according to a seventh modification of the embodiment of the invention.

Further, as in a channel forming body 72 according to a seventh modification shown in FIG. 17, upper and lower corners of end portions 73 of the partition walls 2b toward the junction channels 14 may be rounded and corners of areas of the upper and lower boards 2f, 2g corresponding to the downstream ends of the junction channels 14 may be respectively rounded in the same construction as the third modification shown in FIG. 13.

Figure 18:
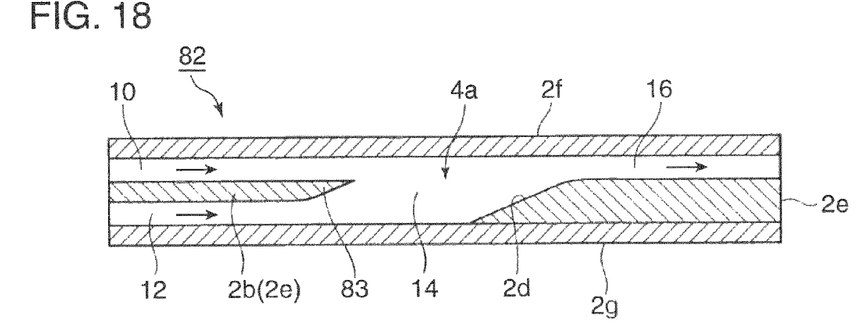
FIG. 18 is an exploded perspective view showing a channel forming body of a reactor according to an eighth modification of the embodiment of the invention.

Further, as in a channel forming body 82 according to an eighth modification shown in FIG. 18, lower corners of end portions 83 of the partition walls 2b toward the junction channels 14 may be rounded and upper corners of the sealing walls 2d may be rounded in the same construction as the fourth modification shown in FIG. 14.

By rounding the respective corners as in the above fifth to eighth modifications, the laminar flows of the first reactant and those of the second reactant more smoothly join in the junction channels 14 and the two reactants are more smoothly introduced from the junction channels 14 into the reaction channels 16.

Although the intermediate board 2e, the upper board 2f and the lower board 2g forming the channel forming body 2 are all made of stainless steel in the above embodiment, these respective boards may be made of another material. For example, the above respective boards may be made of a material such as titanium, glass, ceramic, resin or the like.

Although the intermediate board 2e, the upper board 2f and the lower board 2g forming the channel forming body 2 are diffusion-bonded to each other in the above embodiment, the present invention is not limited thereto. In other words, the above respective boards may be bonded by a bonding method other than diffusion bonding such as brazing, welding or bonding using an adhesive.

Although the formation of the upper and lower grooves 2h, 2i of the intermediate board 2e and that of the openings of the partition walls 2b to form the junction channels 14 are all performed by etching in the above embodiment, these respective parts may be formed by a processing method other than etching. For example, the above respective parts may be formed in the intermediate board 2e by a processing method such as machining, laser machining or electrolytic polishing.

Although all of the first inlet paths 10, the second inlet paths 12, the junction channels 14 and the reaction channels 16 have rectangular cross sections in the above embodiment, the present invention is not limited thereto. For example, these respective parts may be so formed as to have cross-sectional shapes other than rectangular shapes such as round shapes and so on.

Further, the first inlet paths 10, the second inlet paths 12 and the reaction channels 16 may be formed such that the widths and dimensions in the layer-thickness direction thereof have arbitrary dimensional ratios. For example, the first inlet paths 10, the second inlet paths 12 and the reaction channels 16 may be formed into thin layers having very small dimensions in the layer-thickness direction with respect to the widths or may be formed to have such shapes in which the widths and the dimensions in the layer-thickness direction are substantially equal.

Although the first inlet paths 10 and the second inlet paths 12 are vertically arranged in the above embodiment, the present invention is not limited thereto. Specifically, the present invention is applicable to a construction in which the first and second inlet paths 10, 12 are arranged while being separated in one of various directions other than the vertical direction at the opposite sides of the partition walls 2b. For example, the present invention is also applicable to a construction in which the first and second inlet paths 10, 12 are arranged while being laterally separated. Further, the channel forming body 2 may be formed by vertically inverting the construction of the above embodiment. In other words, the laminar flows of the second reactant flowing from the second inlet paths 12 may join those of the first reactant flowing straight from the first inlet paths 10 while being moved toward the lower side in the layer-thickness direction and may be introduced into the reaction channels 16 by arranging the first inlet paths 10 and the reaction channels 16 linearly connected with the first inlet paths 10 at the lower side of the channel forming body 2 while arranging the second inlet paths 12 at the upper side.

(Summary of the above Embodiment)

The above embodiment is summarized as follows.

Specifically, a reactor according to the above embodiment is for reacting first and second reactants while flowing them and comprises a channel forming body internally formed with the channel extending in a specific direction for flowing the first and second reactants in the specific direction, wherein the channel includes a first inlet path arranged at an entrance side of the channel and having the first reactant introduced thereinto; a second inlet path arranged while being separated from the first inlet path with a partition wall of the channel forming body located therebetween and having the second reactant introduced thereinto; a junction channel connected with a downstream side of the first inlet path and that of the second inlet path for causing the first reactant flowing via the first inlet path and the second reactant flowing via the second inlet path to join in the form of laminar flows separated from each other; and a reaction channel connected with a downstream side of the junction channel for permitting the laminar flow of the first reactant and that of the second reactant held in contact with each other and reacting the two reactants at a contact interface thereof, and a dimension of the reaction channel in the layer-thickness direction perpendicular to the contact interface is set to be smaller than the sum of a dimension of the first inlet path in the layer-thickness direction and a dimension of the second inlet path in the layer-thickness direction.

Since the dimension of the reaction channel in the layer-thickness direction perpendicular to the contact interface of the first and second reactants is set to be smaller than the sum of the dimension of the first inlet path in the layer-thickness direction and the dimension of the second inlet path in the layer-thickness direction in this reactor, the first and second reactants can be brought into contact with each other in the form of layers thinner in the reaction channel than in the first and second inlet paths. Thus, the layer thicknesses of the first and second reactants in the reaction channel can be reduced and the contact area of the two reactants per unit volume in the reaction channel can be increased even without reducing the dimensions of the first and second inlet paths in the layer-thickness direction. Therefore, in this reactor, reaction efficiency can be improved by increasing the contact area of the two reactants per unit volume without reducing the dimensions of the first inlet path as an inlet path for the first reactant and the second inlet path as an inlet path for the second reactant in the layer-thickness direction.

In the above reactor, it is preferable that the first inlet path and the reaction channel are formed by a single channel extending straight and having a uniform dimension in the layer-thickness direction; and that the junction channel permits the laminar flow of the second reactant flowing from the second inlet path to join the laminar flow of the first reactant flowing straight from the first inlet path in the layer-thickness direction and introduces the joined first and second reactants into the reaction channel.

By such a construction, the second reactant flowing from the second inlet path can join the first reactant flowing from the first inlet path and the joined first and second reactants can flow into the reaction channel having the same dimension in the layer-thickness direction as the first inlet path. Thus, the contact area of the two reactants per unit volume in the reaction channel can be reliably increased even without reducing the dimensions of the both inlet paths in the layer-thickness direction. Further, since it can be suppressed that the flow of the first reactant is bent in the layer-thickness direction in the process of reaching the reaction channel from the first inlet path in this construction, resistance acting on this flow of the first reactant can be reduced to smoothly flow the first reactant. Furthermore, since the channel from the first inlet path to the reaction channel can be formed straight in the channel forming body in this construction, a forming process can be more simplified as compared with the case where this channel is bent.

In the above reactor, it is preferable that the channel forming body includes an intermediate board, an upper board and a lower board sandwiching the intermediate board from the opposite upper and lower sides in the layer-thickness direction; that an upper groove extending in the specific direction is formed in the upper surface of the intermediate board; a lower groove extending in the specific direction at a position corresponding to the upper groove is formed in the lower surface of the intermediate board; that an opening of the upper groove is covered by the upper board to form the first inlet path; that an opening of the lower groove is covered by the lower board to form the second inlet path; and that a part of the intermediate board located between the upper and lower grooves constitutes the partition wall.

As a method for forming the first and second inlet paths in the channel forming body in a separated manner, it is thought to form a single channel in the channel forming body and then to form the both inlet paths by partitioning the channel by a separate partitioning plate at a middle position in a layer-thickness direction. However, in this method, it is very cumbersome to mount the partitioning plate in such a manner as to partition the channel if a dimension of the channel forming body in a thickness direction is small and a dimension of the channel in the layer-thickness direction is very small. In contrast, according to the above construction, the upper groove at the upper side of the partition wall can be formed into the first inlet path and the lower groove at the lower side of the partition wall can be formed into the second inlet path by sandwiching the intermediate board from the opposite upper and lower sides by the upper and lower boards after the partition wall is first formed in the intermediate board. Thus, the first and second inlet paths can be easily formed even if the dimension of the channel forming body in the thickness direction is small and the dimension of the channel in the layer-thickness direction is very small. Therefore, in the above construction, the first and second inlet paths can be easily formed even if the dimension of the channel forming body in the thickness direction is small.

In the above reactor, a length of the junction channel in a flowing direction of the first and second reactants is preferably larger than a dimension of the partition wall in the layer-thickness direction.

By such a construction, the two reactants can smoothly join in the flowing direction by reducing a movement of the flow of the first reactant in the layer-thickness direction and/or a movement of the second reactant in the layer-thickness direction when the first reactant flowing from the first inlet path and the second reactant flowing from the second inlet path join in the junction channel. In this way, the first and second reactants can easily join in the form of laminar flows separated from each other.

In this case, for example, the length of the junction channel in the flowing direction of the first and second reactants is preferably ten times or more than the dimension of the partition wall in the layer-thickness direction.

In the above reactor, the channel forming body preferably includes a dividing wall for dividing the channel in a width direction orthogonal to the flowing direction of the first and second reactants.

By such a construction, a difference between the width and the dimension in the layer-thickness direction of the reaction channel can be made smaller in each divided channel while a specified flow rate of the reactants is ensured for the entire channel. In this way, a reduction in reaction efficiency between the two reactants in the reaction channel can be suppressed even if the channel forming body is installed while being inclined with respect to the width direction of the channel while specified reaction efficiency is ensured for the entire channel. Specifically, if the channel forming body is installed while being inclined with respect to the width direction of the channel, the contact interface of the two reactants formed in each reaction channel may be formed to connect the opposite side surfaces of the reaction channel facing in the layer-thickness direction. In this case, in such a structure that the channel is not divided in the width direction and the dimension of the reaction channel in the layer-thickness direction is considerably smaller than the width thereof, the area of the contact interface is considerably reduced from the one in a state where the contact interface is formed to connect the opposite side surfaces of the reaction channel facing in the width direction without the channel forming body being inclined. Reaction efficiency between the above two reactants drastically decreases in such a case. In contrast, if the difference between the width and the dimension in the layer-thickness direction of the reaction channel is made smaller as in the above construction, a reduction in the area of the contact interface can be made smaller even if the channel forming body is inclined and the contact interface is formed to connect the opposite side surfaces of the reaction channel facing in the layer-thickness direction. Therefore, in the above construction, a reduction in the reaction efficiency between the two reactants in the reaction channel can be suppressed even if the channel forming body is installed while being inclined with respect to the width direction of the channel.

In the above reactor, it is preferable to comprise a plurality of said channel forming bodies placed one over another.

By such a construction, production efficiency of a reaction product in the entire reactor can be more improved since larger quantities of first and second reactants can be reacted while flowing.

A reacting method according to the above embodiment is a reacting method using the above reactor, comprising the steps of introducing a first reactant into the first inlet path and a second reactant into the second inlet path; joining the first and second reactants in the form of laminar flows separated from each other in the junction channel; and thereafter permitting the joined laminar flows of the first and second reactants held in contact with each other into the reaction channel and reacting the two reactants at a contact interface thereof.

In this reaction method, since the first and second reactants are reacted using the above reactor, a contact area of the two reactants per unit volume can be increased to improve reaction efficiency without reducing dimensions of the first inlet path as an inlet path for the first reactant and the second inlet path as an inlet path for the second reactant in a layer-thickness direction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A reactor for reacting first and second reactants while flowing them, comprising a channel forming body internally formed with a channel extending in a specific direction for flowing the first and second reactants in the specific direction, wherein:

the channel includes:

a first inlet path extending in the specific direction and arranged at an entrance side of the channel and having the first reactant introduced thereinto;

a second inlet path extending in the specific direction parallel to the first inlet path and separated from the first inlet path with a partition wall of the channel forming body located therebetween and having the second reactant introduced thereinto;

a junction channel connected with a downstream side of the first inlet path and that of the second inlet path for causing the first reactant flowing via the first inlet path and the second reactant flowing via the second inlet path to join in the form of laminar flows separated from each other; and a reaction channel extending in the specific direction parallel to the first inlet path and connected with a downstream side of the junction channel for permitting the laminar flow of the first reactant and that of the second reactant held in contact with each other and reacting the two reactants at a contact interface thereof, and a dimension of the reaction channel in the layer-thickness direction perpendicular to the contact interface is set to be smaller than the sum of a dimension of the first inlet path in the layer-thickness direction and a dimension of the second inlet path in the layer-thickness direction, wherein the channel forming body includes a dividing wall for dividing the channel into a plurality of channels separated from one another in a width direction orthogonal to the flowing direction of the first and second reactants and orthogonal to the layer-thickness direction.

2. A reactor for reacting first and second reactants while flowing them, comprising a channel forming body internally formed with a channel extending in a specific direction for flowing the first and second reactants in the specific direction, wherein:

the channel includes:

a first inlet path arranged at an entrance side of the channel and having the first reactant introduced thereinto;

a second inlet path and separated from the first inlet path with a partition wall of the channel forming body located therebetween and having the second reactant introduced thereinto;

a junction channel connected with a downstream side of the first inlet path and that of the second inlet path for causing the first reactant flowing via the first inlet path and the second reactant flowing via the second inlet path to join in the form of laminar flows separated from each other; and a reaction channel connected with a downstream side of the junction channel for permitting the laminar flow of the first reactant and that of the second reactant held in contact with each other and reacting the two reactants at a contact interface thereof, and a dimension of the reaction channel in the layer-thickness direction perpendicular to the contact interface is set to be smaller than the sum of a dimension of the first inlet path in the layer-thickness direction and a dimension of the second inlet path in the layer-thickness direction, wherein the channel forming body includes a dividing wall for dividing the channel into a plurality of channels separated from one another in a width direction orthogonal to the flowing direction of the first and second reactants and orthogonal to the layer-thickness direction.

* * * * *